United States Patent [19]

Duggirala et al.

[11] Patent Number: 6,146,495
[45] Date of Patent: Nov. 14, 2000

[54] KRAFT PROCESS FOR THE PRODUCTION OF WOOD PULP BY ADDING A COPOLYMER OF 1,2-DIHYDROXY-3-BUTENE ANTISCALANT

[75] Inventors: Prasad Yogendra Duggirala, Naperville; John David Morris; Peter Edward Reed, both of Plainfield, all of Ill.; Steven John Severtson, Shoreview, Minn.

[73] Assignee: Nalco Chemical Company, Naperville, Ill.

[21] Appl. No.: 09/144,145

[22] Filed: Aug. 31, 1998

[51] Int. Cl.[7] .................................. D21C 3/20; C02F 5/02
[52] U.S. Cl. ........................... 162/48; 162/72; 162/199; 210/701; 252/180
[58] Field of Search .............................. 162/48, 199, 72; 210/701, 696; 252/180

[56] References Cited

U.S. PATENT DOCUMENTS

| | | | |
|---|---|---|---|
| 4,080,375 | 3/1978 | Quinlan | 260/502.5 |
| 4,253,968 | 3/1981 | Eastman | 210/698 |
| 4,604,431 | 8/1986 | Fong et al. | 525/351 |
| 4,640,793 | 2/1987 | Persinski | 252/82 |
| 4,676,911 | 6/1987 | Fong | 210/701 |
| 4,919,821 | 4/1990 | Fong et al. | 210/701 |
| 5,013,806 | 5/1991 | Blevins et al. | 526/271 |
| 5,135,677 | 8/1992 | Yamaguchi | 252/180 |
| 5,441,602 | 8/1995 | Harris et al. | 162/48 |

FOREIGN PATENT DOCUMENTS

| | | |
|---|---|---|
| 57-144094 | of 1982 | Japan . |
| 59-104496 | of 1984 | Japan . |
| 59-213714 | of 1984 | Japan . |
| 4-28708 | of 1992 | Japan . |
| 9602582A1 | 2/1996 | WIPO . |

OTHER PUBLICATIONS

G.A. Smook, *Handbook for Pulp & Paper Technologists*, 7th Printing, 1982.

*Primary Examiner*—Steve Alvo
*Attorney, Agent, or Firm*—Margaret M. Brumm; Thomas M. Breininger

[57] ABSTRACT

An improved process for inhibiting calcium carbonate scaling in aqueous systems such as that employed in the kraft process for the production of wood pulp. Such an improved process is achieved by the addition to the system of at least one antiscalant comprising at least one monomer unit derived from the group consisting of 1,2-dihydroxy-3-butene, N-(hydroxymethyl) acrylamide, and N-(sulfomethyl) acrylamide, and at least one monomer unit derived from the group consisting of maleic acid, acrylic acid, acrylamide, methacrylic acid, itaconic acid, vinyl sulfonic acid, styrene sulfonic acid, N-tertbutylacrylamide, butoxymethylacrylamide, N,N-dimethylacrylamide, sodium acrylamidomethyl propane sulfonic acid, and salts thereof, with the proviso that said polymers do not contain the monomer unit —($CH_2$—CH=CH—$CH_2$—O)—.

4 Claims, No Drawings

KRAFT PROCESS FOR THE PRODUCTION OF WOOD PULP BY ADDING A COPOLYMER OF 1,2-DIHYDROXY-3-BUTENE ANTISCALANT

INHIBITION OF SCALE IN THE KRAFT PROCESS

This invention relates to a process for the inhibition of scale formation in aqueous systems which are generally maintained under harsh conditions. The invention more particularly relates to an improved kraft process wherein calcium carbonate scale in inhibited. In one specific aspect of this invention, there is provided novel polymeric antiscalants which are useful in the preclusion of calcium carbonate scaling in industrial aqueous systems.

BACKGROUND OF THE INVENTION

Scale forms when the concentration of a dissolved mineral exceeds its solubility limit and the mineral precipitates. Scale is and can be a problem in equipment used in many types of industrial operations utilizing an aqueous system.

As used herein the term "aqueous system" is meant to include any system containing water, including but not limited to cooling water, boiler water, desalination, gas scrubbers, blast furnaces, sewage sludge thermal conditioning equipment, reverse osmosis evaporators, paper processing, mining circuits and the like wherein such systems are operated under harsh conditions of temperature and pH.

The term "harsh conditions" as used herein is intended to be definitive of an aqueous system wherein the temperature is in the range of from about 100° C. to about 200° C. and the pH is in the range of from about 10 to about 14.

Typical equipment used in industrial aqueous operations that require scale inhibition includes, but is not limited to, boilers, evaporators, heat exchangers, other heat transfer equipment, pipes and any other equipment that comes into contact with the aqueous system.

For purposes of this application, such industrial operations are illustrated by the kraft process for the production of wood pulp.

Wood pulp is the basic raw material used in the manufacture of almost all grades of paper and various types of packing products such as drums and cartons.

In order to produce pulp from wood, it is necessary to separate the cellulose fibers from the various organic compounds, mainly lignin, which bind them together. Various mechanical and chemical methods are used to effect this separation, but the most widely used technique is known as the kraft or sulphate process, since it produces pulp which gives high strength and good aging properties to paper products.

In the kraft process, a cooking liquor (white liquor) of sodium hydroxide and sodium sulphide is used to extract the lignin from wood. The process of extraction is carried out in digesters, either batch or continuous. The pH in the digester is generally between about 11 and about 14.

The liquor temperature is maintained between about 150° to about 175° C. A period of from about 2 to about 3 hours is usually required for complete digestion. The pulp is then washed before being sent for further treatment such as bleaching prior to its further use.

The economics of the kraft process depend on the recovery of the cooking liquor. In this recovery process, the digestion chemicals contained in the used cooking liquor (black liquor) are recovered via evaporators, furnaces and a causticizer for reuse in preparing new cooking liquor. Before the black liquor can be used as a feed it is necessary that the black liquor be concentrated, usually to 45% by weight or higher. This concentration is carried out in a multiple-effect evaporator, where live steam is introduced to the first unit (where the liquor is at its highest solids concentration) and flows to the final unit. Such evaporators can be described as one long heat transfer surface where the purpose is to boil off water by providing significant contact between the black liquor and steam heated surfaces. However, a common problem which is experienced in such evaporators is the formation of substantial amounts of deposits which tend to stick to the interior walls or tubes of the evaporator. The primary source of liquor scaling in the evaporator system is insoluble calcium carbonate.

The cooking liquor (white liquor) produced from this process contains sodium hydroxide, sodium sulphide and sodium carbonate due to incomplete reaction in the causticizer, as well as soluble calcium and precipitated calcium carbonate.

In the kraft process, calcium is extracted from the wood, and because of the high pH, temperature and presence of carbonate in the cooking liquor this calcium precipitates as calcium carbonate. The most visible form of the scale is in the cooking liquor heaters which maintain desired digester process conditions and often have to be cleaned about every 2–4 weeks.

Scale formation can also occur on the liquor separator screens which in turn leads to a restriction of liquor flow which reduces plant production and eventually necessitates plant shutdown for cleaning.

Because of the tendency for calcium carbonate scaling in the aqueous systems of the kraft process due to the conditions experienced therein, there becomes a real need for the addition of antiscalants to various locations within the process.

In addition to the scaling problem experienced in the digester, scaling is also a problem in the equipment used for carrying out the bleaching of the wood pulp. Pulp produced by the kraft process is normally bleached in a multistage sequence to obtain the desired brightness and strength. Different bleaching agents are used for this purpose. Chlorine or chlorine dioxide is the most reactive bleaching agent to the lignin remaining in the pulp. Although conditions in the bleach plant are less severe than those found in a kraft digester, the driving force for scale formation is significant. For example, calcium concentrations can climb to over 100 ppm, the pH of the stream entering the bleaching stages is greater than about 11 and the temperatures are still elevated.

From the foregoing, it can be seen that while conditions vary in severity with various stages of the kraft process i.e. the digester, bleach plant and evaporator, such aqueous systems as are contained within the various stages are all under harsh conditions of temperature and pH and as such experience the problem of scale formation during operation.

Thus, it becomes readily apparent that there is a real need in the kraft process for the production of wood pulp which comprises the steps of digesting wood chips in a digesting zone, bleaching of the resulting wood pulp in a bleaching zone and the concentrating of the separated liquor from the digesting zone in an evaporation zone for the providing of an improvement thereto which comprises the addition of a polymeric antiscalant which will inhibit the formation of scale.

Accordingly, it is an object of the present invention to provide a novel process for the inhibition of calcium carbonate scale in aqueous systems which otherwise experience such scale formation due the harsh conditions occurring in the system.

Another object of the present invention is to provide a process for improving the kraft process for the production of wood pulp wherein the formation of calcium carbonate scale is inhibited during plant operations.

A still further object of this invention is to provide novel polymeric antiscalants for use in the treatment of industrial aqueous systems.

Other aspects, objects and the several advantages of this invention will become apparent in light of the following specification and appended claims.

SUMMARY OF THE INVENTION

In accordance with one embodiment of the present invention, we have discovered a process for treating an aqueous liquid having scale forming salts of calcium therein which comprises adding to said aqueous liquid a scale inhibiting amount of a polymeric antiscalant comprising:

(A) 1,2-dihydroxy-3-butene monomer units and, (B) at least one monomer unit derived from the group consisting of maleic acid, acrylic acid, acrylamide, methacrylic acid, itaconic acid, vinyl sulfonic acid, styrene sulfonic acid, N-tertbutylacrylamide, butoxymethylacrylamide, N,N-dimethylacrylamide, sodium acrylamidomethyl propane sulfonic acid, and salts thereof, with the proviso that said polymers does not include the monomer unit —(CH$_2$—CH=CH—CH$_2$—O)—.

In another embodiment of the present invention, there is provided an improved kraft process for the production of wood pulp using novel polymer antiscalants.

Thus, in the kraft process for the production of wood pulp which comprises the steps of digesting wood chips in a digesting zone, bleaching the resulting wood pulp in a bleaching zone, and concentrating the separated liquor from the digesting zone in an evaporation zone, there is provided the improvement which comprises adding to at least one of said digesting zone, bleaching zone and evaporation zone a polymeric antiscalant in an amount sufficient to inhibit the scale formation therein, said antiscalant comprising:

(A) at least one monomer unit derived from the group consisting of 1,2-dihydroxy-3-butene, N-(hydroxymethyl) acrylamide and N-(sulfomethyl) acrylamide and, (B) at least one monomer unit derived from the group consisting of maleic acid, acrylic acid, acrylamide, methacrylic acid, itaconic acid, vinyl sulfonic acid, styrene sulfonic acid, N-tertbutylacrylamide, butoxymethylacrylamide, N,N-dimethylacrylamide, sodium acrylamidomethyl propane sulfonic acid, and salts thereof.

In a still further embodiment of the present invention, there are provided novel polymers comprising:

(A) 1,2-dihydroxy-3-butene monomer units and (B) at least one monomer unit derived from the groups consisting of maleic acid, acrylic acid, acrylamide, methacrylic acid, itaconic acid, vinyl sulfonic acid, styrene sulfonic acid, N-tertbutylacrylamide, butoxymethylacrylamide, N,N-dimethylacrylamide, sodium acrylamidomethyl propane sulfonic acid, and salts thereof, with the proviso that said polymers do not include the monomer unit —(CH$_2$—CH=CH—CH$_2$—O)—.

DETAILED DESCRIPTION OF THE INVENTION

The present invention is based upon our discovery that calcium carbonate is scale in aqueous systems which experience harsh conditions of temperature and pH can be inhibited by the addition to such systems a scale inhibiting amount of a polymeric antiscalant comprising:

(A) at least one monomer unit derived from the group consisting of 1,2-dihydroxy-3-butene, N-(hydroxymethyl) acrylamide and N-(sulfomethyl) acrylamide and, (B) at least one monomer unit derived from the group consisting of maleic acid, acrylic acid, acrylamide, methacrylic acid, itaconic acid, vinyl sulfonic acid, styrene sulfonic acid, N-tertbutylacrylamide, butoxymethylacrylamide, N,N-dimethylacrylamide, sodium acrylamidomethyl propane sulfonic acid, and salts thereof.

Such polymeric antiscalants have a weight average molecular weight (Mw) in the range of from about 1,000 to about 100,000, preferably from about 1,000 to about 50,000. For purposes of this application, all weight average molecular weights are measured by aqueous gel permeation chromatography (GPC) relative to either a polyethylene glycol standard or a polystyrene sulfonate standard.

The amount of polymeric antiscalant which is employed in the practice of this invention is dependent on the nature of the system being treated. In carrying out the process of scale inhibition in accordance with the present invention, the selected polymeric antiscalant is added to the aqueous system to be treated in an amount sufficient to preclude scale formation, deposition on or adherence to the metallic surfaces of the system being treated. In general, effective amounts of the selected polymeric antiscalant are in the range of from about 1 ppm to about 200 ppm.

The polymeric antiscalants, as employed in the process of this invention, can be used alone or in combination with other known scale inhibitors and dispersing agents which are stable under the conditions prevailing in the system being treated. However, such additional scale inhibitors are not required in obtaining satisfactory results when carrying out the process of the present invention using the polymeric antiscalants as described herein.

The particular dosage of polymeric antiscalant will be dependent upon the conditions which are normally experienced in the system being treated. Thus, in the kraft process, the highest dosage levels of polymeric antiscalant will be to the digester with lesser amounts being required for the bleach plant and evaporator.

In the practice of a presently preferred embodiment of this invention, whereby there is achieved an improvement in the kraft process for production of wood pulp through the addition to the digester, bleach plant or evaporator of polymeric antiscalants as herein defined, such addition of the selected antiscalant can be carried out by any means known in the art for addition of antiscalants to a harsh environment. For example, a solution of the selected antiscalant can be continuously introduced into the digester in amounts sufficient to achieve the desired concentration level. Not only does addition at this stage serve to preclude scaling in the digester, it permits antiscalant to be carried over to the washers from which the pulp is screened and cleaned. In addition to the addition of the antiscalants to the digester, such antiscalants can also be introduced into one or more of the bleaching towers, washers or caustic extraction towers which are normally provided in multiple stages to permit the desired chlorination and extraction so as to achieve delignification and ultimate brightening of the pulp. Likewise, since efficient recovery of chemicals from the digestor liquor and reconstitution of the chemicals to form fresh while liquor for use in the digester is desired, addition of one or more of the polymeric antiscalants of this invention to the evaporators serving to concentrate such liquor from the digestor for further use in the process will serve to reduce or preclude undesirable scaling in such equipment.

Thus, by treating one or more of the kraft process zones wherein undesired calcium carbonate scaling is otherwise experienced, there is achieved by the process of the present invention an overall improvement in the efficiency of the kraft process due to the inhibition of scale formation which in turn permits longer operating periods.

A further embodiment of the present invention are a novel group of polymeric antiscalants which exhibit antiscalant properties when employed in aqueous systems having scale forming salts of calcium.

Such novel antiscalants are those polymers comprising 1,2-dihydroxy-3-butene monomer units and at least one monomer unit derived from the group consisting of maleic acid, acrylic acid, acrylamide, methacrylic acid, itaconic acid, vinyl sulfonic acid, styrene sulfonic acid, N-tertbutylacrylamide, butoxymethylacrylamide, N,N-dimethylacrylamide, sodium acrylamidomethyl propane sulfonic acid, and salts thereof, with the proviso that said novel polymers do not include the monomer unit —(CH$_2$—CH=CH—CH$_2$—O)—.

The novel antiscalant polymers can have a mole content of 1,2-dihydroxy-3-butene from about 1 to about 50 percent of the total mole percent in the polymer.

In one presently preferred embodiment of the present invention, the novel antiscalant compositions are a 50 mole percent:50 mole percent copolymer of 1,2-dihydroxy-3-butene and maleic acid having a molecular weight of approximately about 4,000; and a 33.3 mole percent:33.3 mole percent:33.3 mole percent terpolymer of 1,2-dihydroxy-3-butene, maleic acid and acrylic acid having a molecular weight of approximately 10,000.

Such novel polymeric antiscalants can be prepared by conventional free radical polymerization in an aqueous media. Such processes are well known to those skilled in the art. In general, a typical conventional free radical polymerization process includes adding one or more monomers to a reaction vessel followed by neutralization with a suitable base. Polymerization catalysts may also be added to the vessel up-front or fed in gradually during the course of the reaction. Water soluble initiators such as any free radical or redox initiator or combination thereof are added along with any other optional monomer to the reaction mixture in separate feeds over the same amount of time, usually 4 to 6 hours. The reaction temperature is maintained from about 90° to about 100° C. Additional initiator may be used after addition is complete to reduce residual monomer level. At the end of the reaction, a suitable base is added to adjust pH.

1,2-dihydroxy-3-butene can be obtained from Eastman Chemical Company, Fine Chemicals, P.O. Box 431, Kingsport, Tenn. 37662, (telephone number is 1-800-327-8626) or it can be made synthetically by hydrolyzing epoxy butene.

EXAMPLES

The following examples are intended to be illustrative of the present invention and to teach one of ordinary skill how to make and use the invention. These examples are not intended to limit the invention in any way.

Example I

Autoclave Testing of Antiscalant Procedure for the Control of Calcium Carbonate in Kraft Digesters and Bleach Plants In carrying out the tests of the various polymeric antiscalants, a concentrated synthetic black liquor was prepared as follows.

In a 1000 mL beaker, 4 grams (g) of $Na_2CO_3$, 2 g of indulin AT(precipitated lignin) and 16 mL of 500 g/l NaOH were diluted to a volume of 1000 mL using distilled water. The beaker was mixed on a stir plate until no precipitated lignin and sodium carbonate were detected. The dissolved liquor was filtered with a 0.45 μm filter and transferred to a 2000 mL graduated is cylinder. The liquor was diluted to a final volume of 2 liters.

5000 ppm actives based samples of the antiscalant chemistries and calcium solutions were made. All the glassware and autoclaves were acid cleaned using a 10% solution of $H_2SO_4$, 16 B.U.N. tubes were filled with 20 mL of double distilled water and placed in a test tube rack filling a matrix or 8 columns and 2 rows. The autoclave digester was preheated to a temperature of 50° C. (approximately 30 minutes). 25 mL of double distilled water and enough antiscalant solution to produce the desired actives concentrations in 100 mL were added to eight 100 mL volumetric flasks. 50 mL of the concentrated black liquor and 2 mL of 5000 ppm calcium solution were added to each flask and the flasks were brought up to 2 mL below the fill line. The flasks were hand mixed to redissolve any precipitate which formed upon addition of calcium. The contents (100 mL) of the flask were transferred to the autoclaves (Lorentzen & Wettre autoclaves). 2 mL of the sample were transferred to the B.U.N. tubes for the estimation of initial calcium concentration. The autoclaves were sealed with a wrench and the autoclave heater was set as per the desired temperatures. The autoclaves were rotated and heating was begun and the samples were lowered into the hot oil bath. Effect on inhibition of calcium carbonate precipitation in the kraft digester was evaluated at 170° C. for 30 minutes. For the bleach plant screening, the samples were allowed to reach 100° C. and run for 30 minutes at that temperature. The heating was turned off and the samples were raised out of the oil bath. The autoclaves were cooled for 10 minutes in a tub of cold water immediately after removal. The autoclaves were opened and 2 mL of this liquor was filtered through a 0.45 μm syringe filter and transferred to the B.U.N. test tubes for the estimation of final calcium. The B.U.N. tubes were all brought up to the 25 mL line using double distilled water and parafilm was placed over the top. The samples were hand mixed. The calcium levels were measured using atomic absorption using calibrated standards. The percent scale inhibition is expressed as below:

$$\% \text{ Inhibition} = \frac{\text{filtered calcium}}{\text{initial calcium}} * 100$$

The following results were obtained.

It is understood that for each test run, the results given for BLANK (no antiscalant) are not an example of the invention, but rather they are comparative examples.

| % Inhibition at Various Additive Concentrations | | |
|---|---|---|
| In the kraft Digester | | |
| Blank (no antiscalant) | 4.4 | 4.4 |
| Polymer (antiscalant) | 50 ppm | 100 ppm |
| 50:50 copolymer of 1,2-dihydroxy-3-butene, maleic acid | 8.4 | 16 |
| Sulfomethylated poly(maleic acid, acrylic acid) | 6.3 | 10 |
| In the Bleach Plant | | |
| Blank (no antiscalant) | 10 | 10 |
| Polymer (antiscalant) | 50 ppm | 100 ppm |
| 33.3:33.3:33.3 terpolymer of 1,2-dihydroxy-3-butene, maleic acid, acrylic acid | 25 | 62 |
| 50:50 copolymer of 1,2-dihydroxy-3-butene, maleic acid | 52 | 60 |
| Sulfomethylated poly(maleic acid, acrylic acid) | 34 | 67 |
| 45:45:10 terpolymer of maleic acid, acrylic acid, N-hydroxymethyl acrylamide | 40 | 62 |

Example II

Evaluation of Antiscalant Chemistries for Controlling Scale in Black Liquor Evaporators A 12" long Teflon® reactor with an inside diameter of 1.5" and an outside diameter of 2" was used in these screening experiments. A 0.25" cartridge heater (600 W) was inserted into the reactor bottom via a bored 0.5" threaded reducing bushing that was screwed into the bottom Teflon® endcap. A stainless steel adapter attached to the top endcap was used to seat the 24/40 ground-glass joint of a reflux condenser, with a Teflon® sleeve inserted to facilitate sealing of the ground glass-stainless connection. The cooking was carried at 100° C. for 60 minutes. The remaining experimental procedure was followed in accordance with the directions outlined in the kraft digesters and bleach plants screening test procedure of Example I.

The following results were obtained.

| Summary of Screening Result for the Control of Calcium Carbonate Scaling in the Black Liquor Evaporators | | |
|---|---|---|
| | % Inhibition at Various Polymer Concentrations | |
| Blank (no antiscalant) | 10 | 10 |
| Polymer (antiscalant) | 100 ppm | 200 ppm |
| 45:45:10 maleic acid, acrylic acid, N-hydroxymethyl acrylamide | 38 | 99 |
| 33.3:33.3:33.3 terpolymer maleic acid, acrylic acid, dihydroxy-3-butane | 69 | 95 |
| 50:50 copolymer maleic acid, | 37 | 72 |

-continued

| Summary of Screening Result for the Control of Calcium Carbonate Scaling in the Black Liquor Evaporators | | |
|---|---|---|
| | % Inhibition at Various Polymer Concentrations | |
| 1,2-dehydroxy-3-butane Sulfomethylated poly (maleic acid, acrylic acid) | 63 | 100 |

Example III

Preparation of a 33.3 Mole Percent Acrylic Acid/ 33.3 Mole Percent Maleic Acid/33.3 Mole Percent 1,2 Dihydroxy-3-ButeneTerpolymer To a 5-neck, 100 mL resin flask equipped with a mechanical stirrer, reflux condenser, and syringe pumps for continuous addition of monomers and initiators were charged 10.7 g of distilled water, 12.74 g of maleic anhydride, 20 g of a 57 weight percent solution of 1,2-dihydroxy-3-butene, and 12.48 g of 50 weight percent aqueous solution of sodium hydroxide using cooling to control any exotherm. The mixture was then heated to approximately 98° C. At temperature, 0.67 g of a 0.15 percent solution of iron sulfate heptahydrate dissolved in distilled water was added to the reaction mixture. Next, 1.87 g of acrylic acid were added to the reactor followed by 0.34 g of an initiator solution consisting of 0.145 g sodium persulfate, 1.06 g of a 30 weight percent hydrogen peroxide solution, and 4 g of distilled water. The remaining initiator solution and a solution of 7.5 g of acrylic acid and 2.22 g of distilled water, were then fed separately into the flask at a constant rate over a period of approximately 4.5 hours while the reaction temperature was held between 90° C. and 100° C. After monomer and initiator feeding was complete, the reaction was held at temperature for an additional 30 minutes. An additional initiator solution consisting of 9.86 g of a 30 weight percent hydrogen peroxide solution, 1.31 g of sodium persulfate, and 5 g of distilled water was then fed into the reactor over a period of 3 hours, and again held after addition for 30 minutes. The reaction was cooled to 80° C., and a solution of 1.02 g of sodium metabisulfite and 3.63 g of distilled water was added over a half hour period. The reaction mixture was held at temperature for an additional 30 minutes and then cooled to room temperature. $^{13}$CNMR confirmed product formation. The product had a weight average molecular weight of approximately 10,000, as measured by gel permeation chromatography (GPC) using polyethylene glycol (PEG) MW standards.

Example IV

Preparation of a 50 Mole Percent Maleic Acid/50 Mole Percent 1,2-Dihydroxy-3-Butene Copolymer To the reactor described in Example III were charged 15 g of distilled water, 15.39 g of maleic anhydride, 24.24 g of a 57 weight percent solution of 1,2-dihydroxy-3-butene, and 13.80 g of a 50 weight percent aqueous solution of sodium hydroxide using cooling to control any exotherm. The mixture was then heated to approximately 98° C. At temperature, an initiator solution consisting of 2.57 g of sodium persulfate, 18.86 g of a 30 weight percent hydrogen peroxide solution, and 5.49 g of distilled water was then fed into the flask at a constant rate over a period of approximately 4.5 hours while the reaction temperature was held between 90° C. and 100° C. After monomer and initiator feeding was complete, the reaction was held at temperature for an additional 30 minutes. The reaction was then cooled to 80° C., and a solution of 1.02 g of sodium metabisulfite and 3.63 g of distilled water was added over a half hour period. The reaction mixture was held at temperature for an additional 30 minutes and then cooled to room temperature. $^{13}$CNMR confirmed product formation. The product had a weight average molecular weight of approximately 4,000, as measured by gel permeation chromatography (GPC) using polyethylene glycol (PEG) MW standards.

The specific examples herein disclosed are to be considered as being primarily illustrative. Various changes beyond those described, will, no doubt, occur to those skilled in the art; and such changes are to be understood as forming a part of this invention insofar as they fall within the spirit and scope of the appended claims.

We claim:

1. In a kraft process for the production of wood pulp which comprises the steps of digesting wood chips in a digesting zone, bleaching the resulting wood pulp in a bleaching zone, and concentrating the separated liquor from the digesting zone in an evaporation zone, the improvement which comprises adding to at least one of said digesting zone, bleaching zone and evaporation zone a polymeric antiscalant in an amount sufficient to inhibit the scale formation therein, said polymeric antiscalant comprising:

(A) at least one monomer unit consisting of 1,2-dihydroxy-3-butene; and (B) at least one monomer unit selected from the group consisting of maleic acid and a combination of maleic acid and acrylic acid;

wherein said polymeric antiscalant is added in an amount in the range of from about 1 ppm to about 200 ppm, wherein said polymeric antiscalant has a weight average molecular weight in the range of from about 1,000 to about 100,000 and wherein said 1,2-dihydroxy-3-butene monomer units are present in an amount in the range of from about 1 mole percent to about 50 mole percent.

2. The process of claim 1 wherein said polymeric antiscalant is a copolymer of 1,2-dihydroxy-3-butene and maleic acid.

3. In a kraft process for the production of wood pulp which comprises the steps of digesting wood chips in a digesting zone, bleaching the resulting wood pulp in a bleaching zone, and concentrating the separated liquor from the digesting zone in an evaporation zone, the improvement which comprises adding to at least one of said digesting zone, bleaching zone and evaporation zone a polymeric antiscalant in an amount sufficient to inhibit the scale formation therein, said polymeric antiscalant comprising a terpolymer of 1,2-dihydroxy-3-butene, maleic acid and acrylic acid, wherein said terpolymer is 33.3 mole percent 1,2-dihydroxy-3-butene, 33.3 mole percent maleic acid and 33.3 mole percent acrylic acid, wherein said polymeric antiscalant is added in an amount in the range of from about 1 ppm to about 200 ppm, and wherein said polymeric antiscalant has a weight average molecular weight in the range of from about 1,000 to about 100,000.

4. In a kraft process for the production of wood pulp which comprises the steps of digesting wood chips in a digesting zone, bleaching the resulting wood pulp in a bleaching zone, and concentrating the separated liquor from the digesting zone in an evaporation zone, the improvement which comprises adding to at least one of said digesting zone, bleaching zone and evaporation zone a polymeric antiscalant in an amount sufficient to inhibit the scale formation therein, said polymeric antiscalant comprising a copolymer of 1,2-dihydroxy-3-butene and maleic acid, wherein said copolymer is 50 mole percent 1,2-dihydroxy-3-butene and 50 mole percent maleic acid, wherein said polymeric antiscalant is added in an amount in the range of from about 1 ppm to about 200 ppm, and wherein said polymeric antiscalant has a weight average molecular weight in the range of from about 1,000 to about 100,000.

* * * * *